3,262,805
PROCESS OF COATING TO MAKE LEATHER SUBSTITUTE AND RESULTING ARTICLE
Tomoo Aoki, Sennan-gun, Japan, assignor of one-half to Toyo Cloth Company, Limited, Osaka Prefecture, Japan, and one-half to Toyo Rayon Company, Tokyo, Japan
Filed Mar. 14, 1963, Ser. No. 265,050
17 Claims. (Cl. 117—11)

This invention relates to the production of leather substitutes having excelled creases or wrinkles permanently ingrained like those of natural leathers.

An object of the invention is to provide leather substitutes very close to natural leathers in appearance, touch and other physical properties.

Another object of the invention is to provide a method for producing leather substitutes having creases or wrinkles very similar to those of natural leathers.

A still further object of the invention is to provide leather substitutes excelled in flexing-fatigue life and scratch resistance.

There is employed in the prior art the so-called embossing processing for imparting creases or wrinkles to the surface layer of leather substitutes. The creases or wrinkles obtained thereby, however, are so inferior to those of natural leathers that the resultant compositions still remain very unsatisfactory in appearance, touch and other physical properties.

Needless to say, the creases or wrinkles of natural leathers are a product of the structural difference between the compact grain layer and the relatively coarse collagen layer. The principle of the invention is based upon this fact, comprising fastly agglutinating two or more resin composition layers having different physical properties with a base material, treating the resultant article by crumpling with the surface layer inside, and then unfolding the article to the original state. The compression distortions which are imparted to the intermediate layer by means of the base material yield physical distortions which are permanently ingrained in the surface layer of the article in the state of creases or wrinkles like those of natural leathers.

In the invention are employed as the base material woven and unwoven fabrics and knitted articles made of polyamide, polyacrylonitrile and its copolymers, polypropylene, polyethylene, polyvinylacetal, polyvinyl chloride, polyvinylidene chloride, polyester and the like synthetic fibers; viscose rayon, cellulose acetate and the like artificial fibers; cotton, silk, wool and other natural fibers; paper, etc. The base material is so selected as to be stiff enough to impart required compression distortions to the intermediate layer when crumpled. Knitted articles having a relatively large elongation coefficient are employed with a relatively thick intermediate layer composition. Alternatively, said articles are processed with resin so as to impart the required stiffness thereto as the base material.

Materials employed as the intermediate layer of the invention are prepared from one or more species selected from the synthetic resins, such as polyamide, polyvinyl chloride, polypropylene, polyethylene, polyurethane and the like; artificial rubbers, such as butadiene-acrylonitrile copolymer, butadiene-styrene copolymer, neoprene, urethane-rubber and the like; and natural rubbers.

The intermediate layer of the invention is so prepared as to be provided with compression load deflection in the order of 100 to 800 g./cm.$^2$ for a 25% reduction in the whole thickness. Those layers or compositions having higher stiffness tend to yield relatively small physical distortions, and those layers or compositions having lower stiffness relatively large physical distortions, when crumpled, so that there can be produced no desirable creases or wrinkles in the resultant leather compositions.

In the invention is employed a porous material or composition as the intermediate layer, having a volume from 1.2 to 4.0 times as large as the volume of the original mass, so as to provide the layer with the required elasticity for being substantially released from the physical distortions when unfolded after the crumpling or creasing processing. When the porosity is too large, the layer becomes too pliant to preserve the required strength of the resultant leather substitute; when the porosity is too small, the layer tends to become too stiff to meet the requirements of the invention.

In practice, the intermediate layer of the invention is prepared in accordance with a known art, such as admixing a blowing agent and heating the composition at a temperature substantially close to the softening point of the components. The resultant layer is then fastly mounted onto the surface of the base material together with the surface layer separately prepared. Alternatively, the intermediate layer composition admixed with a blowing agent is first mounted on the base material and the surface layer composition is applied thereto by coating, and then heat is applied to the resultant article to inflate the intermediate layer.

As the intermediate layer of the invention, best results are obtained with the composition consisting of polyvinyl chloride, or polyvinyl chloride admixed with butadiene rubber in the order of 40 weight percent at most, or polyurethane prepared by reacting polyester or polyether having from 40 to 60 hydroxyl value and from 1,800 to 4,000 molecular weight with aromatic diisocyanate in an NCO/OH molar ratio of from 0.9 to 1.15:1. The resultant leather substitutes are markedly similar in appearance, touch and other physical properties to the natural leathers, particularly to Morocco leathers.

The thickness of the intermediate layer of the invention ranges from 0.05 mm. to 10 mm. in accordance with the requirements of the finished leather substitutes.

The materials forming the surface layer of the invention are resin compositions prepared from solvent-soluble copolyamides, N-alkoxymethyl polyamides in the order of from 18 to 40 mol percent alkoxymethylation, linear polyurethane, polyester, polyvinyl chloride, polyethylene prepared under low pressure, and the like. Said materials may be employed with a plasticizer.

In the invention, the surface layer composition is so prepared as to be provided with a tensile recovery in the order of 92% at the highest for a 20% elongation. Compositions having higher tensile recovery fail to permanently preserve the resultant creases or wrinkles.

Materials employed for the surface layer composition are of the order of from 3 to 30 kg./mm.$^2$ in terms of Young's coefficient, a value in terms of 0.15 mm. thick coatings obtained by coating the solution on a glass plate and evaporating the solvent in accordance with D638, American Standard Testing Method. Those layers or compositions having a higher stiffness produce linear creases, and those layers or compositions having a lower stiffness tend to yield discrete wrinkles insufficiently developed.

The surface layer of the leather substitutes of the invention is 0.03 mm. thick at most. Best results can be obtained with the layer about 0.007 mm. thick. Resin materials to be employed are dissolved in a suitable solvent and applied by coating to the surface of the intermediate layer. Solvents employed are of a boiling point substantially lower than the softening point of the intermediate and base layer components.

Materials constituting the surface layer of the leather substitutes of the invention are as specified above. Particularly desirable results are obtained with a copolymer of from 30 to 70 mols of caprolactam and from 70 to 30 mols of hexamethylene adipamide; or of caprolactam, hexamethylene adipamide and hexamethylene sebacamide in the order of 20 to 40 mols each; or of N-alkoxymethyl polyamide in the order of 14 to 35 mol percent alkoxymethylation and having alkoxy groups from 1 to 5, particularly from 1 to 2, carbon atoms. Resins like polyacrylonitrile can be employed with polyurethane.

Flexing-fatigue life and scratch resistance of the finished leather substitutes can be augmented by cross-linking with heat the molecules of N-alkoxymethyl polyamide or polyurethane in or without the presence of a known cross-linking agent. In the invention, for instance, polyester or polyether having from 50 to 80 hydroxyl value and from 1,400 to 3,400 molecular weight is reacted with aromatic diisocyanate in an NCO/OH molar ratio of from 0.9 to 1.15:1.

Following preparation of the layer compositions, the intermediate layer composition is mounted onto the upper surface of the base material with an adhesive agent or by calendering. Then the surface layer composition dissolved in an organic solvent is applied by coating to the surface of the intermediate layer. The solvent is removed by evaporation to yield a thin surface layer. Alternatively, the surface layer composition may be mounted onto the intermediate layer by means of a suitable adhesive agent or a solvent. The surface layer composition solution is in the order of 3,000 cps. at most to facilitate coating which may be repeated several times until the desired thickness is obtained.

According to the principle of the invention, the article prepared in the manner as described above is crumpled with the surface layer inside. Then, the intermediate layer shrinks in accordance with the compression distortions imparted thereto by means of the base layer, and the resultant physical distortions yield numerous creases or wrinkles which are permanently ingrained in the surface layer of the article even when the article is unfolded to the original flat state following the crumpling or creasing processing. The compression distortions, moreover, substantially leaves no traces in the intermediate layer even when unfolded because of the plasticity and elasticity thereof as specified before.

The creases or wrinkles formed in the surface layer of the leather substitutes of the invention vary in size and distribution or disposition in accordance with the size and distribution or disposition of the pores present in the intermediate layer in particular and the stiffness of the surface layer. For instance, the intermediate layer having fairly sizable discrete pores yields fairly sizable creases in those portions of the surface layer situated above the areas where pores swarm, whereas discrete small pores result in shallow creases or wrinkles evenly distributed in the surface layer. Continuous, chained pores, on the other hand, yield creases of linear, deep furrows, as the air present in the pores slightly leaks and the resistance of the intermediate layer is accordingly reduced when compressed by crumpling.

The crossing processing by crumpling may be carried out at room temperature when a resin having plasticity at room temperature is employed as a component of the surface layer. But when the surface layer consists of a resin having small propensity for plastic distortion at room temperature, such as polyvinyl chloride or chlorosulfonated polyethylene, the substitute is crumpled in a hot bath or a liquid vapor having no property to melt or dissolve the resin components.

In order to augment the flexing-fatigue life and scratch resistance of the leather substitutes of the invention, a non-porous protective layer consisting of one or more species of synthetic resins or artificial or natural rubbers and having a Young's coefficient of from 1 to 13 kg./mm.$^2$, preferably of about 5 kg./mm.$^2$, may be inserted 0.1 mm. thick at most, preferably from 0.05 to 0.06 mm. thick in between the surface and the intermediate layer. In practice, the protective layer is profitably formed by coating or calendering said resin to the surface of the intermediate layer.

In the invention may be added a suitable stabilizer, dye, pigment and/or antielectrification agent to the intermediate and/or surface layer composition as the case may require.

Figure 1:
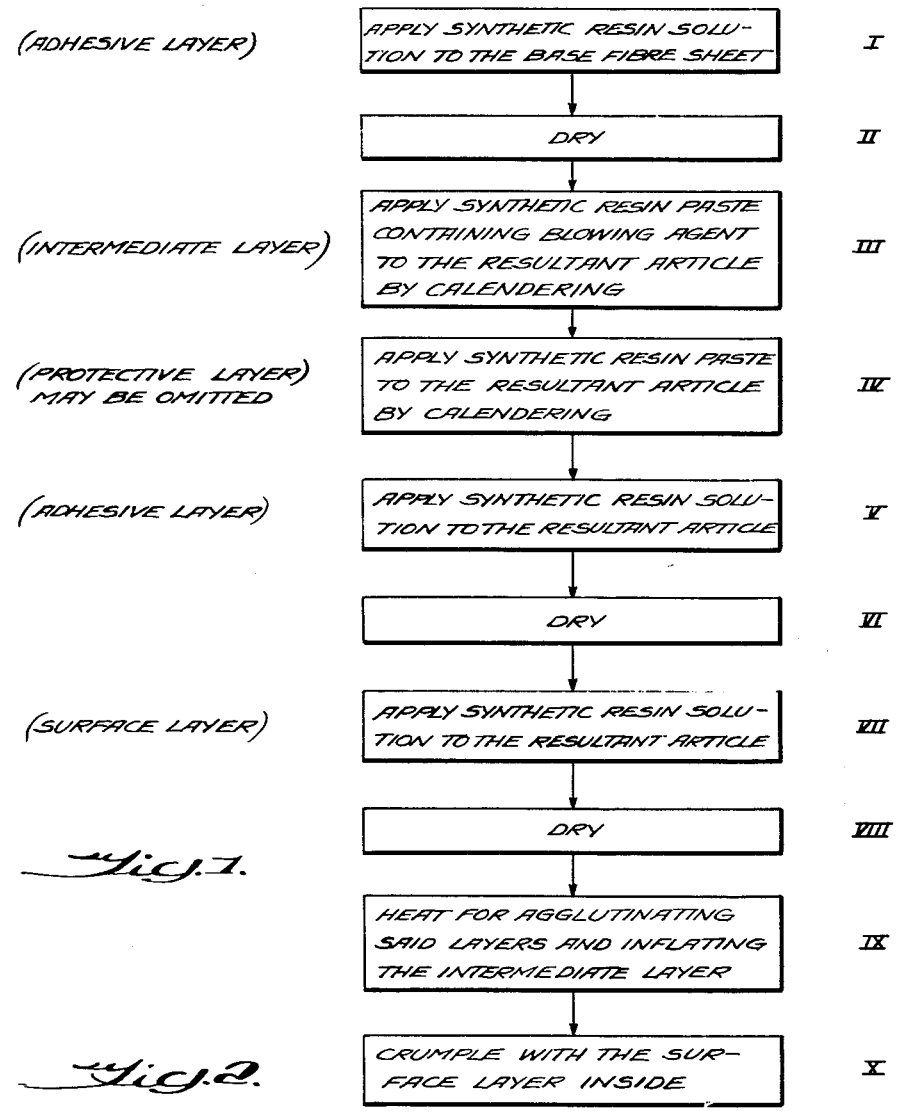
FIG. 1 is a flow sheet of the process according to the invention.
Figure 2:
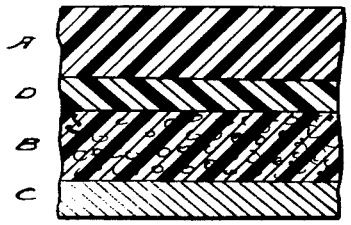
FIG. 2 is a cross-section of one embodiment of a leather substitute according to the invention.
Figure 3:
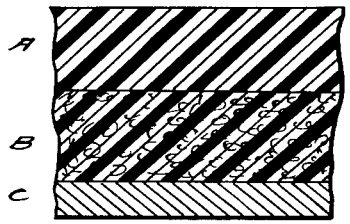
FIG. 3 is a cross-section of another embodiment of a leather substitute according to the invention.

Referring to FIGS. 2 and 3, A represents the surface layer, B represents the intermediate layer, C represents the base and D represents the protective layer.

Preferred examples are as follows wherein all parts are by weight.

Example 1

A 20% ethyl acetate solution of an 80:15:5 mol ratio copolymer of butadiene, acrylonitrile and acrylic acid is applied by coating as an adhesive agent to the upper surface of a staple fiber fabric base (200 g./cm.$^2$) and dried. To the upper surface of the resultant article is calendered 0.2 mm. thick a blend of 70 parts of polyvinyl chloride in the order of 1,000 polymerization, 30 parts of an 80:20 mol ratio copolymer of butadiene and acrylonitrile, 50 parts of dioctyphthalate, 5 parts of dibutyl tin laurate, 2 parts of azodicarbonamide and 10 parts of carbon black to form an intermediate layer. To the upper surface of the resultant article is calendered 0.07 mm. thick a blend of 70 parts of polyvinyl chloride in the order of 1,500 polymerization, 30 parts of an 80:20 mol ratio copolymer of butadiene and acrylonitrile, 50 parts of dioctylphthalate, 5 parts of dibutyl tin laurate and 10 parts of carbon black to form a protective layer. Onto the upper surface of the resultant article is further coated an adhesive agent consisting of 10 parts of an 80:20 mol ratio of copolymer of butadiene and acrylonitrile, 1 part of from di- to hexamer of phenol-formaldehyde and 89 parts of methylethyl ketone, and dried. To the upper surface of the resultant article is then applied by coating a solution of 100 parts of N-methoxymethyl polycapramide in the order of 25 mol percent methoxymethylation and 15 parts of carbon black in 400 parts of methanol, and dried to form a 0.007 mm. thick surface layer. The resultant article is heated at 200° to 210° C. for 1.5 minute to agglutinate the base, the intermediate and the surface layer with one another and to foam the blowing agent to inflate the intermediate layer of 0.4 mm. thick. The article is then crumpled at room temperature with the surface layer inside and unfolded to the former state, yielding in the surface layer of the resultant leather substitute numerous creases or wrinkles, agreeable touch and other desirable physical properties very similar to those of calfskin.

Example 2

To the upper surface of a 140 g./m.$^2$ twilled cotton fabric base is applied by coating a 20% ethyl acetate solution of an 80:15:5 mol ratio copolymer of butadiene, acrylonitrile and acrylic acid, and dried to form an adhesive layer. Onto the upper surface of the resultant article is calendered a blend of 7 parts of polyvinyl chloride of 1,000 polymerization, 30 parts of an 80:20 molar ratio copolymer of butadiene and acrylonitrile, 40 parts of dioctylphthalate, 3 parts of dibutyl tin laurate, 2 parts of azodicarbonamide and 10 parts of ferric oxide to form 0.2 mm. thick intermediate layer. To the upper surface of the resultant article is applied by coating a solution of 100 parts of N-methoxymethyl polycapramide in the order of 25 mol percent methoxymethylation and 5 parts of ferric oxide in 300 parts of methanol, and dried to form a 0.007 mm. thick surface layer. The resultant article is then heated at 210° to 220° C. for 1.5 minutes to foam the blowing agent to inflate the intermediate layer to 0.4 mm. thick, crumpled, and unfolded as described in Example 1, yielding creases, touch and other physical properties very close to those of lambskin.

*Example 3*

To the upper surface of a nylon fabric base (230 g./m.$^2$) is applied by coating as an adhesive agent a 25% methanol solution of N-methoxymethyl polycapramide of 37 mol percent methoxymethylation and dried. To the upper surface of the resultant article is applied by coating a blend of 100 parts of N-methoxymethyl polycapramide in the order of 25 mol percent methoxymethylation, 2 parts of benzene sulfonyl hydrazide, 1 part of phenyl-beta-naphthylamine, 0.05 part of ammonium phosphate, 2 parts of chrome yellow and 300 parts of methanol, and dried to form a 0.3 mm. thick intermediate layer. To the upper surface of the resultant article is applied by coating a solution of 100 parts of a 2:2:1 mol ratio copolymer of caprolactam, 6,6-nylon and hexamethylene sebacamide and 2 parts of chrome yellow in 700 parts of methanol, and dried to form a 0.007 mm. thick surface layer. The resultant article is then heated at 150° C. for 2 minutes to agglutinate the base, the intermediate and the surface layer with one another and to foam the blowing agent to inflate the intermediate layer to 0.5 mm. thick, crumpled with the surface layer inside and unfolded to the former flat state, yielding creases, touch and other physical properties very close to those of deerskin.

*Example 4*

To the upper surface of the intermediate layer of the article prepared in the same manner and composition as described in Example 2 is applied by coating a solution of 25 parts of polyurethane prepared by reacting polyester having 68 hydroxyl value and 2,100 molecular weight with naphthalene-1,5-diisocyanate in an NCO/OH molar ratio of 1.05:1, 4 parts of methyl methacrylate in the order of 800 polymerization and 4 parts of chrome yellow in 200 parts of dimethylformamide, and dried to form a 0.007 mm. thick surface layer. Then the resultant article is heated at 210° to 220° C. for 1.5 minutes as described in Example 2, crumpled with the surface layer inside, and unfolded, yielding creases relatively more coarse than those obtained in Example 2.

*Example 5*

To the upper surface of a fabric base as employed in Example 2 is applied 0.25 mm. thick by calendering a blend of 100 parts of polyurethane prepared by reacting polyester having 52 hydroxyl value and 3,000 molecular weight with naphthalene-1,5-diisocyanate in an NCO/OH molar ratio of 1.05:1, 2 parts of azodicarbonamide and 20 parts of carbon black; cured at 200° C. for 1¾ minutes to inflate the layer, and cooled to form a 0.5 mm. thick intermediate layer. To the upper surface of the resultant article is applied by coating a solution of 100 parts of a 1:1:1 mol rate copolymer of caprolactam, hexamethylene adipamide and hexamethylene sebacamide, 5 parts of isopropanolamide of ricinoleic acid and 10 parts of carbon black in 500 parts of methanol, and dried to form a 0.007 mm. thick surface layer. The resultant article is then crumpled with the surface layer inside and unfolded to the former flat state, yielding numerous creases, touch and appearance very close to those of cowhide.

I claim:

1. A leather substitute comprising a sheet shaped base selected from the group consisting of woven fabrics, unwoven fabrics, knitted fabrics and paper, an intermediate layer 0.05 to 10 mm. thick, bonded to said base, of at least one material selected from the group consisting of polyamides, polyvinyl chloride, polypropylene, polyethylene, polyurethanes, butadiene-acrylonitrile copolymers, butadiene-styrene copolymers, urethane rubber and natural rubber, said intermediate layer being inflated with pores of 1.2–4.0 times the original volume and requiring a compression load of 100–800 g./cm.$^2$ to have its thickness reduced by 25%, a surface layer bonded over said intermediate layer not more than 0.3 mm. thick of a material selected from the group consisting of solvent soluble copolymerized polyamides, N-alkoxy methylated polyamides, linear polyurethanes, polyesters, polyvinyl chloride and low pressure polyethylene, said surface layer having a tensile recovery for 20% elongation of less than 92% and a Young's coefficient of 3–30 kg./mm.$^2$, said surface layer having a crease pattern on its outer surface due to permanent strain produced by crumpling the sheet shaped base with the intermediate and surface layers bonded thereto with the surface layer folded inside, the elongation capacity of said sheet shaped base being such as to provide the required compression distortions to produce said permanent strain in the surface layer during said crumpling.

2. The leather substitute according to claim 1 in which the surface layer comprises a copolyamide of 30 to 70 mols of caprolactam with 70 to 30 mols of hexamethylene adipamide.

3. The leather substitute according to claim 1 in which the surface layer comprises a copolyamide of caprolactam, hexamethylene adipamide and hexamethylene sebacamide in proportions of about 20 to 40 mols of each.

4. The leather substitute according to claim 1 in which the surface layer comprises an N-alkoxy methyl polyamide having about 14 to 35 mol percent of alkoxy methylation, the alkoxy groups being of 1 to 5 carbon atoms.

5. The leather substitute according to claim 1 in which the surface layer comprising a polyurethane obtained by reacting a member selected from the group consisting of polyesters and polyethers having a hydroxyl value of from 50 to 80 and a molecular weight of from 1400 to 3400 with an aromatic diisocyanate in an NCO/OH molar ratio of from 0.9 to 1.15:1.

6. The leather substitute according to claim 1 wherein the intermediate layer is a porous material comprising 100 parts by weight of a polyvinyl chloride in the order of from 800 to 2,000 polymerization, from 0 to 40 parts by weight of butadiene rubber and from 30 to 100 parts by weight of plasticizer.

7. The leather substitute according to claim 6 in which the surface layer comprises a copolyamide of 30 to 70 mols of caprolactam with 70 to 30 mols of hexamethylene adipamide.

8. The leather substitute according to claim 6 in which the surface layer comprises a copolyamide of caprolactam, hexamethylene adipamide and hexamethylene sebacamide in proportions of about 20 to 40 mols of each.

9. The leather substitute according to claim 6 in which the surface layer comprises an N-alkoxy methyl polyamide having about 14 to 35 mol percent of alkoxy methylation, the alkoxy groups being of 1 to 5 carbon atoms.

10. The leather substitute according to claim 6 in which the surface layer comprises a polyurethane obtained by reacting a member selected from the group consisting of polyesters and polyethers having a hydroxyl value of from 50 to 80 and a molecular weight of from 1400 to 3400 with an aromatic diisocyanate in an NCO/OH molar ratio of from 0.9 to 1.15:1.

11. The leather substitute according to claim 1 wherein the intermediate layer is a porous polyurethane prepared by reacting one member selected from the group consisting of polyester and polyether having a hydroxyl value of from 40 to 60 and a molecular weight of from 1,800 to 4,000 with aromatic diisocyanate in an NCO/OH molar ratio of from 0.9 to 1.15.1.

12. The leather substitute according to claim 11 in which the surface layer comprises a copolyamide of 30 to 70 mols of caprolactam with 70 to 30 mols of hexamethylene adipamide.

13. The leather substitute according to claim 11 in which the surface layer comprises a copolyamide of caprolactam, hexamethylene adipamide and hexamethylene sebacamide in proportions of about 20 to 40 mols of each.

14. The leather substitute according to claim 11 in which the surface layer comprises an N-alkoxy methyl polyamide having about 14 to 35 mol percent of alkoxy methylation, the alkoxy groups being of 1 to 5 carbon atoms.

15. The leather substitute according to claim 11 in which the surface layer comprises a polyurethane obtained by reacting a member selected from the group consisting of polyesters and polyethers having a hydroxyl value of from 50 to 80 and a molecular weight of from 1400 to 3400 with an aromatic diisocyanate in an NCO/OH molar ratio of from 0.9 to 1.15:1.

16. A process for the production of a leather substitute which comprises coating a surface of a sheet shaped base selected from the group consisting of woven fabrics, unwoven fabrics, knitted fabrics and paper with a composition comprising at least one material of the group consisting of polyamides, polyvinyl chloride, propylene, polyethylene, polyurethanes, butadiene-acrylonitrile copolymers, butadiene-styrene copolymers, neoprene and natural rubber, and a foaming agent which decomposes to form a gas at a temperature near the softening point of said material, heating the coated product to decompose the foaming agent and inflate the coating to 1.2 to 4 times the original volume and produce a foamed coating 0.05 to 10 mm. thick which requires a load of 100–800 g./cm.$^2$ to have its thickness reduced by 25%, forming a surface coating less than 0.03 mm. thick, over said foamed coating, of a material selected from the group consisting of solvent soluble copolymerized polyamides, N-alkoxy methylated polyamides, linear polyurethanes, polyesters, polyvinyl chloride and low pressure polyethylene, said surface coating having a tensile recovery for a 20% elongation of less than 92% and a Young's coefficient of 3–30 kg./mm.$^2$ and crumpling the laminate thus obtained with the surface layer inside to produce a crease pattern in said surface layer caused by permanent strain, the elongation capacity of said sheet shaped base being such as to provide the required compression distortions to produce said permanent strain in the surface layer during said crumpling.

17. A process for the production of a leather substitute which comprises coating a surface of a sheet shaped base selected from the group consisting of woven fabrics, unwoven fabrics, knitted fabrics and paper with a composition comprising at least one material of the group consisting of polyamides, polyvinyl chloride, polypropylene, polyethylene, polyurethanes, butadiene-acrylonitrile copolymers, butadiene-styrene copolymers, neoprene and natural rubber, and a foaming agent which decomposes to form a gas at a temperature near the softening point of said material, forming a surface coating less than 0.03 mm. thick, over said first coating, of a material selected from the group consisting of solvent soluble copolymerized polyamides, N-alkoxy methylated polyamides, linear polyurethanes, polyesters, polyvinyl chloride and low pressure polyethylene, said surface coating having a tensile recovery for a 20% elongation of less than 90% and a Young's coefficient of 3–30 kg./mm.$^2$, heating the coated product to decompose the foaming agent in said first coating and inflate the coating to 1.2 to 4 times the original volume and produce a foamed coating 0.05 to 10 mm. thick which requires a load of 100–800 g./cm.$^2$ to have its thickness reduced by 25% and crumpling the laminate thus obtained with the surface layer inside to produce a crease pattern in said surface layer caused by permanent strain, the elongation capacity of said sheet shaped base being such as to provide the required compression distortions to produce said permanent strain in the surface layer during said crumpling.

References Cited by the Examiner

UNITED STATES PATENTS

| | | | |
|---|---|---|---|
| 2,065,892 | 12/1936 | Hanley | 117—120 XR |
| 2,721,811 | 10/1955 | Dacey et al. | 117—11 |
| 2,763,914 | 9/1956 | Wood | 117—11 |
| 2,811,464 | 10/1957 | Stiehl et al. | 117—11 |
| 2,879,197 | 3/1959 | Muskat et al. | |
| 2,973,284 | 2/1961 | Semegen. | |

FOREIGN PATENTS 949,859   2/1964   Great Britain.

MURRAY KATZ, *Primary Examiner.*